US012670613B2

(12) United States Patent　(10) Patent No.: US 12,670,613 B2
Challa et al.　(45) Date of Patent: *Jun. 30, 2026

(54) SYSTEMS AND METHODS FOR IMAGE-BASED LOCATION DETERMINATION

(71) Applicant: SenSen Networks Group Pty Ltd., Victoria (AU)

(72) Inventors: Subhash Challa, Victoria (AU); Nhat Vo, Victoria (AU); Louis Quinn, Victoria (AU); Duc Vo, Victoria (AU)

(73) Assignee: SenSen Networks Group Pty Ltd., Victoria (AU)

( * ) Notice: Subject to any disclaimer, the term of this patent is extended or adjusted under 35 U.S.C. 154(b) by 376 days.

This patent is subject to a terminal disclaimer.

(21) Appl. No.: 17/910,684

(22) PCT Filed: Feb. 25, 2021

(86) PCT No.: PCT/AU2021/050162
§ 371 (c)(1),
(2) Date: Sep. 9, 2022

(87) PCT Pub. No.: WO2021/179036
PCT Pub. Date: Sep. 16, 2021

(65) Prior Publication Data
US 2024/0052126 A1　Feb. 15, 2024
US 2025/0111534 A9　Apr. 3, 2025

(30) Foreign Application Priority Data

Mar. 10, 2020　(AU) ................................ 2020900736
Aug. 18, 2020　(AU) ................................ 2020902942

(51) Int. Cl.
*G06T 7/73*　(2017.01)
*G06V 10/70*　(2022.01)
(Continued)

(52) U.S. Cl.
CPC ................ *G06T 7/74* (2017.01); *G06V 10/70* (2022.01); *G06V 10/751* (2022.01); *G06V 10/82* (2022.01);
(Continued)

(58) Field of Classification Search
None
See application file for complete search history.

(56) References Cited

U.S. PATENT DOCUMENTS 7,355,527 B2　4/2008　Franklin et al.
9,324,003 B2　4/2016　France et al.
(Continued)

FOREIGN PATENT DOCUMENTS

CN　110136199 B　*　9/2022　........... G01C 21/165
EP　3731154 A1　10/2020
(Continued)

OTHER PUBLICATIONS

Extended European Search Report in European Appln. No. 21766884. 7, mailed on Feb. 9, 2024, 9 pages.
(Continued)

*Primary Examiner* — Chan S Park
(74) *Attorney, Agent, or Firm* — Fish & Richardson P.C.

(57) ABSTRACT

Embodiments relate to systems and methods of location determination based on images. Embodiments perform comparison of an input image to images in a library of reference background images using a background matching module to identify a matching image. Embodiments determine location associated with the input image based on the metadata associated with the matching background image.

14 Claims, 6 Drawing Sheets

(51) Int. Cl.

| | |
|---|---|
| *G06V 10/75* | (2022.01) |
| *G06V 10/82* | (2022.01) |
| *G06V 20/52* | (2022.01) |
| *G06V 20/58* | (2022.01) |

(52) U.S. Cl.
CPC ............ *G06V 20/52* (2022.01); *G06V 20/582* (2022.01); *G06V 20/586* (2022.01)

(56) References Cited

U.S. PATENT DOCUMENTS

| | | | |
|---|---|---|---|
| 9,449,228 | B1 | 9/2016 | Jing et al. |
| 9,710,488 | B2 | 7/2017 | Kansäl et al. |
| 10,311,409 | B1 | 6/2019 | Brailovskiy et al. |
| 2006/0106504 | A1 | 5/2006 | Carpenter |
| 2012/0114178 | A1 | 5/2012 | Platonov et al. |
| 2013/0243250 | A1 | 9/2013 | France et al. |
| 2014/0249896 | A1 | 9/2014 | Nerayoff et al. |
| 2017/0017848 | A1 | 1/2017 | Gupta et al. |
| 2017/0124395 | A1 | 5/2017 | Cohen et al. |
| 2019/0259278 | A1 | 8/2019 | Franklin et al. |
| 2019/0286891 | A1* | 9/2019 | Sarkar ...................... G06N 3/08 |
| 2022/0093101 | A1* | 3/2022 | Krishnan ............... G06V 40/20 |
| 2023/0091062 | A1 | 3/2023 | Challa et al. |
| 2023/0260154 | A1 | 8/2023 | Challa et al. |

FOREIGN PATENT DOCUMENTS

| | | |
|---|---|---|
| GB | 2510586 A | 8/2014 |
| WO | WO 2018/121360 | 7/2018 |

OTHER PUBLICATIONS

Choi et al., "Localization using GPS and VISION aided INS with an Image Database and a Network of a Ground-based Reference Station in Outdoor Environments," International Journal of Control, Automation, and Systems, Aug. 2011, 9(4):716-725.

Li et al., "Seamless Positioning and Navigation by Using Geo-Referenced Images and Multi-Sensor Data," Sensors, Jul. 2013, 13(7):9047-9069.

Mousavian et al., "Semantically Guided Location Recognition for Outdoors Scenes," Paper, Presented at IEEE International Conference on Robotics and Automation (ICRA), May 26, 2015, 8 pages.

Panboonyuen et al., "Semantic Segmentation on Remotely Sensed Images Using an Enhanced Global Convolutional Network with Channel Attention and Domain Specific Transfer Learning," Remote Sensing, Jan. 2019, 11(1):83.

Tian et al., "Cross-View Image Matching for Geo-localization in Urban Environments," IEEE, Computer Vision and Pattern Recognition, Jul. 2017, 3608-3616.

Vertongen et al., "Location-based Services using Image Search," IEEE, Workshop on Applications of Computer Vision, Jan. 2008, 6 pages.

Vishal et al., "Accurate Localization by Fusing Images and GPS Signals," IEEE, Computer Vision and Pattern Recognition Workshops, Jun. 2015, 17-24.

Extended European Search Report in European Appln. No. 21767330.0, mailed on Feb. 13, 2024, 9 pages.

Extended European Search Report in European Appln. No. 23181130.8, mailed on Sep. 15, 2023, 9 pages.

International Preliminary Report on Patentability in International Appln. No. PCT/AU2021/050160, mailed on Sep. 22, 2022, 8 pages.

International Preliminary Report on Patentability in International Appln. No. PCT/AU2021/050162, mailed on Sep. 22, 2022, 12 pages.

International Search Report and Written Opinion in International Appln. No. PCT/AU2021/050160, mailed on May 6, 2021, 17 pages.

International Search Report and Written Opinion in International Appln. No. PCT/AU2021/050162, mailed on Mar. 26, 2021, 18 pages.

Kendall et al., "PoseNet: A Convolutional Network for Real-Time 6-DOF Camera Relocalization," Proceedings of the IEEE International Conference on Computer Vision, 2015.

Weyand et al., "PlaNet Photo—Geolocation with Convolutional Neural Networks," European Conference on Computer Vision, 2016.

* cited by examiner

100

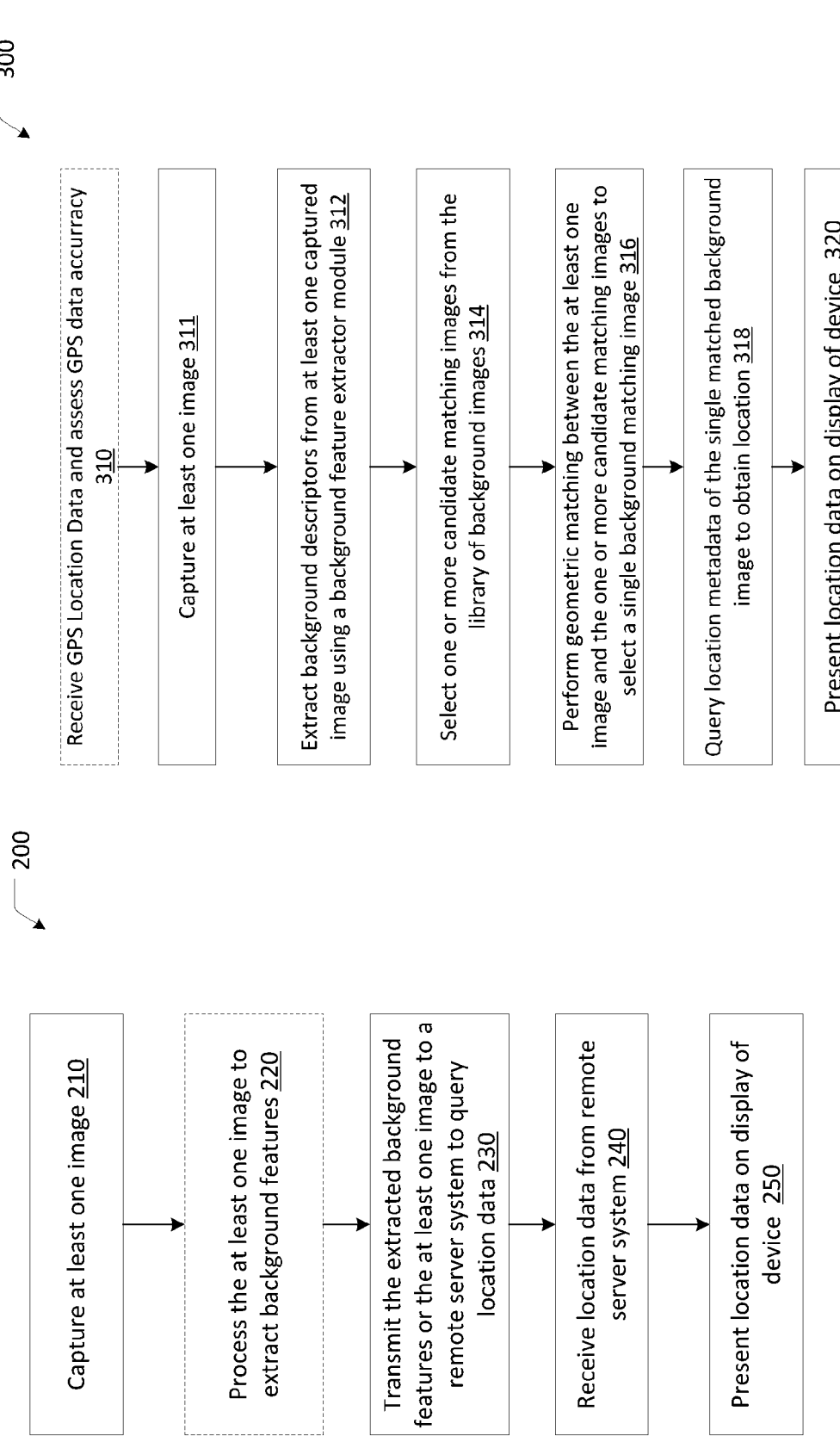

300

Receive GPS Location Data and assess GPS data accuracy 310

Capture at least one image 311

Extract background descriptors from at least one captured image using a background feature extractor module 312

Select one or more candidate matching images from the library of background images 314

Perform geometric matching between the at least one image and the one or more candidate matching images to select a single background matching image 316

Query location metadata of the single matched background image to obtain location 318

Present location data on display of device 320

Capture at least one image 210

Process the at least one image to extract background features 220

Transmit the extracted background features or the at least one image to a remote server system to query location data 230

Receive location data from remote server system 240

Present location data on display of device 250

Figure 2

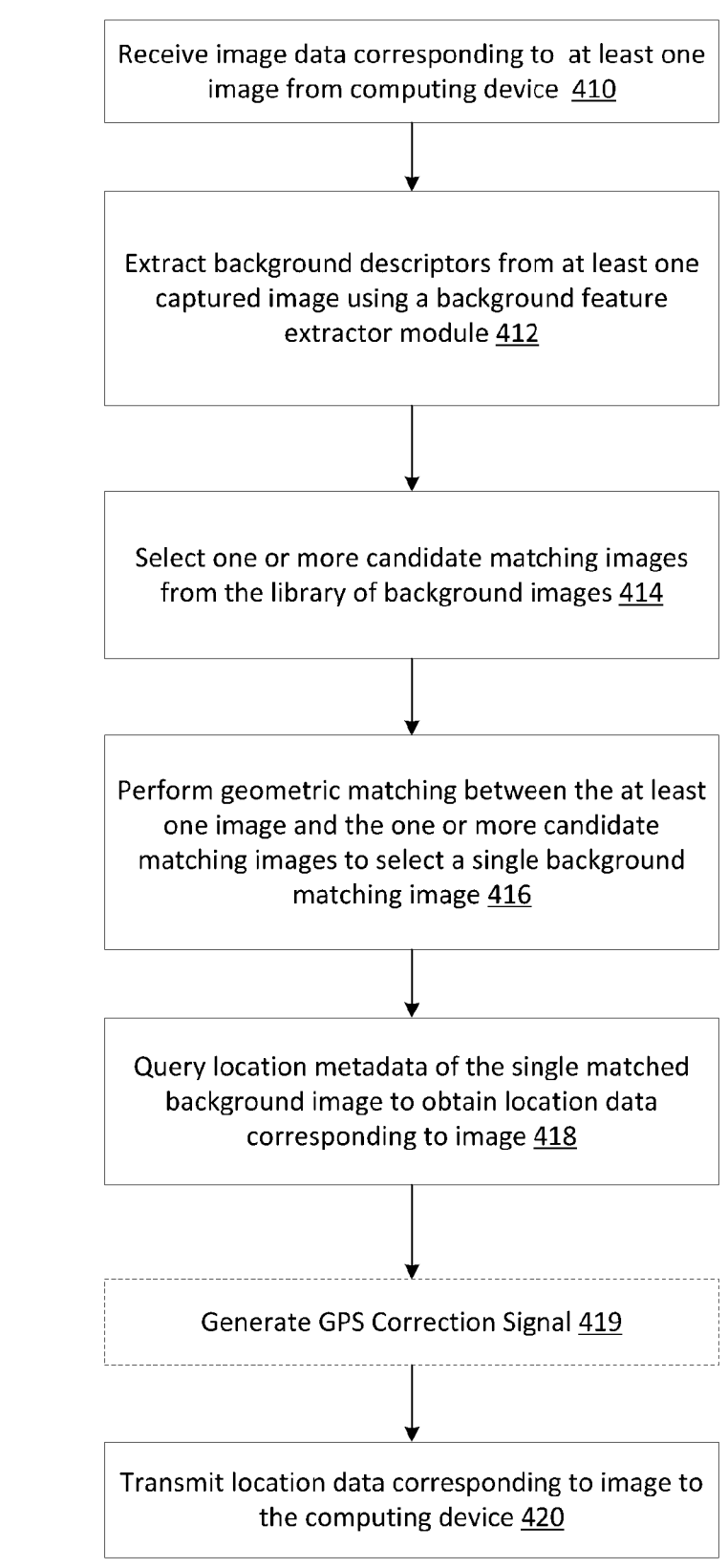

400

Receive image data corresponding to at least one image from computing device 410

Extract background descriptors from at least one captured image using a background feature extractor module 412

Select one or more candidate matching images from the library of background images 414

Perform geometric matching between the at least one image and the one or more candidate matching images to select a single background matching image 416

Query location metadata of the single matched background image to obtain location data corresponding to image 418

Generate GPS Correction Signal 419

Transmit location data corresponding to image to the computing device 420

SYSTEMS AND METHODS FOR IMAGE-BASED LOCATION DETERMINATION

TECHNICAL FIELD

Embodiments relate to systems and methods for location determination. Embodiments relate to systems and methods for image-based location determination.

BACKGROUND

Global Positioning System (GPS) technologies assist in the determination of location by communication with GPS specialised satellites in communication with a GPS receiver. Each GPS satellite continuously transmits a radio signal containing the current time and data about its position. The time delay between when the satellite transmits a signal and the receiver receives it is proportional to the distance from the satellite to the receiver. A GPS receiver monitors multiple satellites and solves equations to determine the precise position of the receiver and its deviation from true time. To get accurate location information, four satellites must be in view of the GPS receiver for it to compute four unknown quantities (three position coordinates and clock deviation from satellite time).

GPS based location estimation requires an unobstructed line of sight to at least four satellites to accurately locate the position of the GPS receiver. Poor connectivity to GPS satellites or connectivity to less than 4 GPS satellites leads to inaccuracies in the determination of location based on GPS. Connectivity to GPS satellites may also be affected by extreme atmospheric conditions, such as geomagnetic storms. Obstacles such as walls, buildings, skyscrapers and trees may obstruct the line of sight to a GPS receiver resulting in inaccurate location estimation. In areas where several obstructions are present, such as in parts of cities, GPS location information may be unreliable or inaccurate.

Any discussion of documents, acts, materials, devices, articles or the like which has been included in the present specification is not to be taken as an admission that any or all of these matters form part of the prior art base or were common general knowledge in the field relevant to the present disclosure as it existed before the priority date of each claim of this application.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

SUMMARY

Some embodiments relate to a system for location determination, the system comprising:
    a computing device comprising at least one processor and a memory accessible to the at least one processor;
    wherein the memory comprises a library of reference background images and metadata for each reference background image, wherein the metadata comprises location information; and
    wherein the memory stores program code executable by the at least one processor to configure the at least one processor to:
        receive an input image data from a remote computing device, wherein the input image data includes image data of at least one image captured by the remote computing device at a location to be determined;
        process the received input image data using a background matching module to identify matching reference background image;
        determine location information corresponding to the input image data based on the metadata of the matching reference background image in the library; and
        transmit the determined location information to the remote computing device.

The background matching module of some embodiments comprises: a background feature extractor neural network, and the at least one processor is further configured to identify the matching reference background image by:
    extracting background descriptors from the at least one captured image using the background feature extractor neural network;
    selecting one or more candidate matching images from the library of background images based on the extracted background descriptors;
    performing geometric matching between the at least one captured image and the candidate matching images to select the matching reference background image.

Geometric matching in some embodiments comprises identifying common visual features in the at least one captured image and each of the candidate matching images. In some embodiments, geometric matching is performed using a random sample consensus process.

In some embodiments, the background feature extractor neural network is trained to extract background descriptors corresponding to one or more stationary features in the at least one captured image.

In some embodiments the memory stores program code executable by the at least one processor to further configure the at least one processor to:
    receive GPS data corresponding to the input image from the remote computing device, wherein the GPS data comprises a low data quality indicator;
    generate a GPS correction signal based on the determined location information;
    transmit the GPS correction signal to the remote computing device.

In some embodiments the memory stores program code executable by the at least one processor to further configure the at least one processor to:
    receive GPS data corresponding to the input image from the remote computing device, wherein the GPS data comprises a low data quality indicator;
    determine a subset of images from the library of background images based on the GPS data; and
    select the one or more candidate matching images from the subset of images from the library of background images based on the extracted background descriptors.

Some embodiments relate to a system for location determination in an urban area, the system comprising:
    at least one camera, wherein the at least one camera is positioned to capture images of the urban area while the at least one camera is moving in the urban area;
    a computing device moving with the at least one camera and in communication with the at least one camera to receive the captured images;
    the computing device comprising at least one processor and a memory accessible to the at least one processor;

wherein the memory comprises a library of reference background images and metadata for each reference background image, wherein the metadata comprises location information;

wherein the memory stores program code executable by the at least one processor to configure the at least one processor to:

process a captured image using a background matching module to identify a matching reference background image;

determine a location of the at least one camera and the computing device based on the metadata of the matching reference background image.

In some embodiments, processing the captured image using a background matching module comprises:

extracting background descriptors from the captured image;

selecting one or more candidate matching images from the library of reference background images based on the extracted background descriptors;

performing geometric matching between the captured image and the candidate matching images to select the matching reference background image.

In some embodiments, the background matching module comprises a background feature extractor neural network configured to extract background descriptors corresponding to one or more stationary features in the at least one captured image.

In some embodiments, the geometric matching is performed using a random sample consensus process; and wherein the geometric matching comprises identifying common visual features in the at least one captured image and each of the candidate matching images.

In some embodiments, the computing device is configured to determine the location in real-time.

Some embodiments relate to a computer implemented method for location determination, the method performed by a computing device comprising at least one processor in communication with a memory, the method comprising:

receiving an input image by the computing device from a remote computing device, wherein the input image corresponds to a location to be determined;

processing the received input image using a background matching module provided in the memory of the computing device to identify a matching reference background image from among a library of reference background images stored in the memory;

determining location information corresponding to the input image based on the metadata of the matching reference background image; and transmitting the determined location information to the remote computing device.

In some embodiments, the background matching module comprises a background feature extractor neural network, and the method further comprises identifying the matching reference background image by:

extracting background descriptors from the at least one captured image using the background feature extractor neural network;

selecting one or more candidate matching images from the library of background images based on the extracted background descriptors;

performing geometric matching between the at least one captured image and the candidate matching images to select the matching reference background image.

In some embodiments, the geometric matching comprises identifying common visual features in the at least one captured image and each of the candidate matching images.

In some embodiments, the geometric matching is performed using a random sample consensus process.

In some embodiments, the background feature extractor neural network is trained to extract background descriptors corresponding to one or more permanent stationary features in the at least one captured image.

The method of location determination of some embodiments further comprises:

receiving GPS data corresponding to the input image from the remote computing device, wherein the GPS data comprises a low data quality indicator;

generating a GPS correction signal based on the determined location information;

transmitting the GPS correction signal to the remote computing device;

wherein the GPS correction signal comprises information accessible by the remote computing device to determine a more accurate GPS location data.

In some embodiments, the method of location determination of some embodiments further comprises:

receiving GPS data corresponding to the input image from the remote computing device, wherein the GPS data comprises a low data quality indicator;

determining a subset of images from the library of background images based on the GPS data; and selecting the one or more candidate matching images from the subset of images from the library of background images based on the extracted background descriptors.

Some embodiments relate to a computer implemented method for location determination, the method performed by a computing device comprising at least one processor in communication with a memory, the method comprising:

receiving an input image by the computing device from a remote computing device, wherein the input image corresponds to a location to be determined;

processing the received input image using a background matching module provided in the memory of the computing device to identify a matching reference background image from among a library of reference background images stored in the memory;

determining location information corresponding to the input image based on the metadata of the matching reference background image; and transmitting the determined location information to the remote computing device.

Some embodiments relate to a system for location determination in an urban area, the system comprising:

at least one camera, wherein the at least one camera is positioned to capture images of the urban area while the at least one camera is moving in the urban area;

a computing device moving with the at least one camera and in communication with the at least one camera to receive the captured images;

the computing device comprising at least one processor and a memory accessible to the at least one processor;

wherein the memory comprises a library of reference background images and metadata for each reference background image, wherein the metadata comprises location information;

wherein the memory stores program code executable by the at least one processor to configure the at least one processor to:

process a captured image using a background matching module to identify a matching reference background image;

determine a location of the at least one camera and the computing device based on the metadata of the matching reference background image.

Some embodiments relate to a computer-readable storage medium storing instructions that when executed by a computer cause the computer to perform the method of location determination according to the embodiments.

BRIEF DESCRIPTION OF DRAWINGS

FIG. 2 is a flowchart of a process for location determination according to some embodiments;

FIG. 3 is a flowchart of a process for location determination executed by a computing device according to some embodiments;

FIG. 4 is a flowchart of a process for location determination executed by a remote server according to some embodiments;

DETAILED DESCRIPTION

The described embodiments relate to systems and methods for location determination or estimation using images. In urban areas with a high density of buildings, GPS signal connectivity and accuracy are often poor on the street or ground level, leading to inaccurate location determination using GPS devices. The described embodiments rely on image processing techniques to determine location information in real-time or near real-time. Described embodiments rely on image processing techniques to determine a location in an urban area by matching persistent background in images. Some embodiments also generate GPS correction signals based on a location determined by processing images of an urban area.

Figure 1:
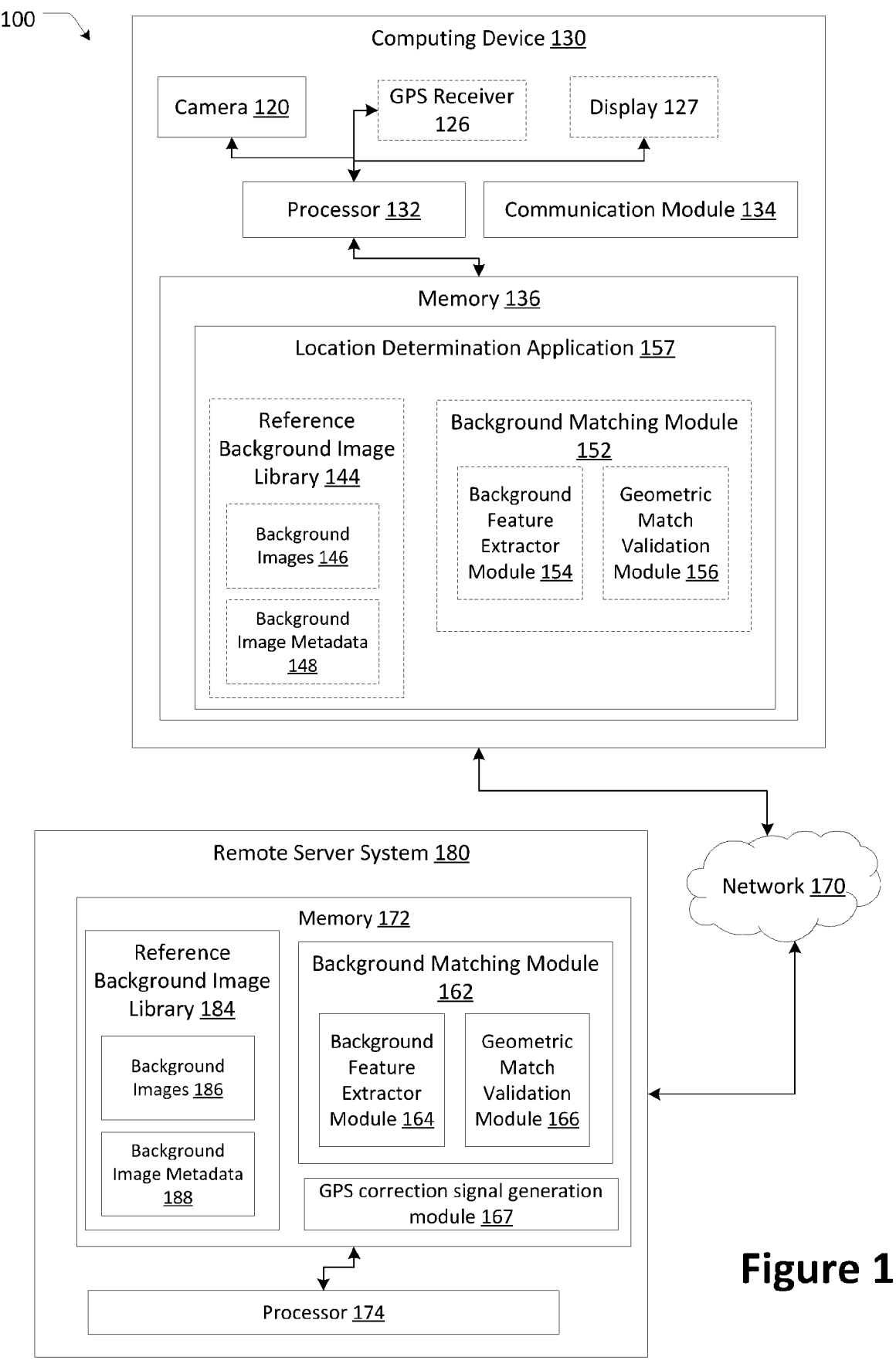
FIG. 1 is a block diagram of a system for location determination according to some embodiments.

FIG. 1 is a block diagram of a system 100 according to some embodiments. System 100 comprises a computing device 130 capable of communicating with a remote computer system 180 over a network 170. The computing device 130 comprises at least one camera 120, a GPS receiver 126 and a display 127.

The computing device 130 also comprises at least one processor 132, a communication module 134, and memory 136. Memory 136 may include both volatile and non-volatile memory. In some embodiments, the processor 132 may be specifically designed for accelerating the operation of machine learning programs or processes. In particular, the at least one processor 132 may comprise a graphics processing unit (GPU) to accelerate the execution of machine learning processes or programs. GPUs enable highly parallel computing operations and are therefore more suitable for the execution of machine learning processes or programs to obtain results in real-time or near real-time. In some embodiments, the computing device may be an end-user handheld computing device, including a smartphone or a tablet device.

The memory 136 may comprise a reference background image library 144, a background matching module 152. The reference background image library 144 comprises reference background images 146 and metadata associated with the reference background images 148. The background matching module 152 comprises a background feature extractor module 154 and a geometric match validation module 156. The communication module 134 comprises hardware and software necessary to facilitate wired or wireless communication between the computing device 130 and network 170. Wireless communication may be achieved through a wireless telecommunication network such as a 3G, 4G or 5G network, for example.

The GPS receiver 126 may make available to the computing device 130 GPS Data corresponding to the location of the computing device 130. GPS data generated by GPS receivers comprises a quality indication of the GPS signal. For example, GPS data presented in a '$GPGGA' (Global Positioning System Fix Data) format stipulated by the National Marine Electronics Association (NMEA) 0183 standard comprises a GPS fix quality indicator, a horizontal dilution of precision indicator (HDOP). The computing device 130 may be configured to process the GPS data generated by the GPS receiver 126 and determine if the one or more GPS data quality indicators as received point to poor quality GPS signal data or GPS signal data of less than desired precision. In some embodiments, the GPS signal data with less than desired precision may be used by the background matching module 152 to narrow down the background images 146 for comparison providing a computational advantage by relatively narrowing down the number of images in the background matching module 152 for consideration.

The network 170 may include, for example, at least a portion of one or more networks having one or more nodes that transmit, receive, forward, generate, buffer, store, route, switch, process, or a combination thereof, etc. one or more messages, packets, signals, some combination thereof, or so forth. The network 170 may include, for example, one or more of: a wireless network, a wired network, an internet, an intranet, a public network, a packet-switched network, a circuit-switched network, an ad hoc network, an infrastructure network, a public-switched telephone network (PSTN), a cable network, a cellular network, a fibre-optic network, some combination thereof, or so forth.

Various machine learning techniques may be employed by the embodiments to perform background extraction from images and comparison of the similarity of two images. In some embodiments, the background matching module 162 may perform background extraction using deep learning based neural networks. In some embodiments, the deep learning based frameworks for background extraction may include regions with convolutional neural networks (R-CNN), or fast region-based convolutional network method (Fast R-CNN), or a faster region-based convolutional network method (Faster R-CNN), for example.

A CNN as implemented by some embodiments may comprise multiple layers of neurons that may differ from each other in structure and operation. The first layer of a CNN may be a convolution layer of neurons. The convolution layer of neurons performs the function of extracting features from an input image while preserving the spatial relationship between the pixels of the input image. The output of a convolution operation may include a feature map of the input image. The operation of convolution is performed using a filter or kernel matrix and the specific weights in the filter or kernel matrix are obtained or calibrated by training the CNN by the processes described subsequently.

After a convolution layer, the CNN in some embodiments implements a pooling layer or a rectified linear units (ReLU) layer or both. The pooling layer reduces the dimensionality of each feature map while retaining the most important feature information. The ReLU operation introduces non-linearity in the CNN since most of the real-world data to be learned from the input images would be non-linear. A CNN may comprise multiple convolutional, ReLU and pooling layers wherein the output of an antecedent pooling layer may be fed as an input to a subsequent convolutional layer. This multitude of layers of neurons is a reason why CNNs are described as a deep learning algorithm or technique. The final one or more layers of a CNN may be a traditional multi-layer perceptron neural network that uses the high-level features extracted by the convolutional and pooling layers to produce outputs. The design of a CNN is inspired by the patterns and connectivity of neurons in the visual cortex of animals. This basis for the design of CNNs is one reason why a CNN may be chosen for performing the function of object detection in images.

The reference background image library 144 comprises reference background images 146 and background image metadata 148. Reference background images 146 include images that serve as references for the background matching module 152 during a process of matching images captured by camera 120 to determine location. Reference background image metadata 148 includes metadata regarding each reference background image. The metadata 148 may include location information associated with the reference background image. In some embodiments, the location information may comprise longitude coordinate information and latitude coordinate information or an address associated with the location.

The background matching module 152 performs the function of matching an image captured by the camera 120 with an image in the reference background image library 144. To efficiently perform background comparison, in some embodiments the background matching module 152 may incorporate an image retrieval and comparison process known as DELF (Deep Local Feature) that is based on attentive local feature descriptors suitable for large-scale image retrieval and comparison.

Before implementing system 100 for location determination or estimation, a survey may be conducted of the various locations in an urban area. The survey may include photographing specific locations and mapping the photographs with the location they correspond to. The survey essentially populates the contents of the reference background image library 144. The need for specificity of the determined location during location determination or estimation may govern the number of photographs required to cover a continuous urban area. If the determined location could be acceptably within a range of 10 meters, then a photograph may be taken at every 10 meters over a continuous urban area to populate the reference background image library 144. In some embodiments, the survey to gather reference background images may be conducted during various lighting conditions or weather conditions to enable determination of location despite changes in lighting or weather conditions.

After completion of the survey of the urban area, the background feature extractor module 154 may be trained to process captured images to extract background features or background features descriptors in the captured images. The background descriptors are an encoded representation of the background of a captured image. The background descriptors enable comparison of the background of various images using computational optimisation techniques such as a nearest neighbour search.

The background descriptors may correspond to regions or portions of an image that are permanent or stationary. The determined background descriptors may accordingly be used to distinguish between stationary and dynamic portions of an image corresponding to a location. For example, in an image of a bus stop with a billboard, the image regions of the billboard may be considered dynamic and the background feature extractor module 154 may be trained to disregard the portions or regions of an image that correspond to the billboard. In the same image of the bus stop, portions of the image corresponding to a sign or a permanent structure such as a post or a shelter can be extracted by the background feature extractor module 154 as a background descriptor for the image. Accordingly, the background feature extractor module 154 is trained to identify background descriptors in images that correspond to permanent or stationary structures providing an efficient and reliable basis for comparison with other images corresponding to the same location.

In some embodiments, the feature extractor module 154 may comprise CNNs trained to extract background feature descriptors from captured images. The CNNs may comprise an additional layer of neurons (attention determination layers) trained to determine attention indicators or weights for features in a captured image. Features corresponding to a persistent background may be given a high attention weight and features corresponding to non-persistent or transient background may be given a low attention weight, for example. The attention determination layer, in essence, helps the background feature extractor module 154 differentiate between persistent and transient parts of a captured image and assists the efficient comparison of the background of a captured image with the background of images in the reference background image library 144.

In some embodiments, the system 100 may perform location determination or estimation in real-time or in near real-time. In an urban area, a large number of reference background images may be necessary to canvas the entire urban area. The DELF process incorporated by the background matching module 152 enables an efficient comparison between a captured image and the images in the reference background library 144.

In some embodiments, the background feature extractor module 154 may identify more than one matching background image. This may be because of the relative similarity of backgrounds. In such cases, the geometric match validation module 156 may assist in narrowing down to a single matched image. The geometric match validation module 156 may rely on homography testing processes to narrow down to a single matched reference background image. In some embodiments, the geometric match validation module 156 may rely on a random sample consensus (RANSAC) process to narrow down to a single matched reference background image.

The geometric match validation module 156 comprises program code to analyse two images and determine or identify one or more common visual features in the two images. For example, the geometric match validation module 156 may extract distinct visual features or shapes or curves from two images. An overlap between the corresponding distinct visual features or shapes or curves from each of the images may be determined to assess whether the two images may be considered to be a match and accordingly may be considered to correspond to a common location.

In some embodiments, the background matching module 152 may rely on a scale-invariant feature transform (SIFT) process to detect and describe local features in images to perform background matching. In some embodiments, the background matching module 152 may rely on a speeded-up robust features (SURF) process to detect and describe local features in images to perform background matching.

The remote computer system 180 comprises at least one processor 174 in communication with a memory 172. In some embodiments, the image processing operations to perform location determination or estimation may be performed by the computing device 130. However, to cover larger urban areas, a larger reference background image library 144 may be required. The computing device 130 of some embodiments may have limited image storage capacity in memory 144. In some embodiments, the remote server 180 may comprise a reference image background image library 184 comprising background images 186 and background image metadata 188. The remote server system 180 may have a scalable memory 172 which may be expandable to include reference image background image library 184 covering larger urban areas or multiple urban areas to allow image-based location determination or estimation over multiple urban areas such as multiple cities, for example. The reference background image library 144 may be a subset of the larger reference image background image library 184.

In some embodiments, computing device 130 may have limited computation or processing capability. In such embodiments, the image processing operations to perform location determination or estimation may be performed by the remote server system 180. The memory 172 of the remote server system 180 also comprises a background matching module 162. The background matching module 162 may comprise a background feature extractor module 164 and a geometric match validation module 166. The background matching module 162 may perform functions identical to the background matching module 152 but with access to greater processing capability on the remote server 180 and the larger reference background image library 184.

In some embodiments, the remote server system 180 may comprise a GPS correction signal generation module 167 provided in its memory 136. Signals generated by conventional GPS receivers are subject to various forms of errors. The errors may include errors due to obstruction of GPS signals by permanent structures such as buildings or trees, reflection of GPS signals by buildings, radio interference, solar storms, for example. One alternative for the correction of GPS signal errors is to use a Differential Global Positioning System (DGPS). A DGPS uses a network of fixed ground-based reference stations to broadcast the difference between positions indicated by the GPS satellite system and known fixed positions of the ground-based reference stations. A GPS receiver configured to receive signals from a DGPS system uses the signals transmitted by the DGPS system to correct and/or recalibrate its calculated location.

In some embodiments, the GPS correction signal generation module 167 generates a GPS correction signal or location information including location coordinates, such as longitude and latitude coordinates or an address, based on the location information determined based on one or more received images.

The various modules implemented in the memory 136 of the computing device 130 and the memory 172 of the remote server system 180 comprise program code implementing the computing or data processing capability of the respective modules. In addition, the various modules may also comprise or may have access to one or more software packages, software libraries, configurations or configurations files, Application Programming Interfaces (APIs) to perform the computing or data processing operation or functions of the respective modules. In some embodiments, the various modules when executed by a processor may execute as one or more processes coordinated by an operating system executing on the computing device 130 or the remote server system 180. Each process of the various modules may comprise one or more threads executing concurrently to perform the data processing, image processing or communication operations or the various modules.

FIG. 2 is a flowchart of a process 200 for location determination or estimation according to some embodiments. The process 200 comprises the computing device 130 transmitting image data to the remote server system 180 to receive location data corresponding to the transmitted image data. As a precondition to the operation of the location determination or estimation process of FIG. 2, a survey of the various locations in the relevant urban area is conducted and the reference background image library 144 and/or 184 are populated along with the relevant image metadata including location data, for example. The location data in some embodiments may comprise specific coordinate information defining a location, such as a longitude and a latitude coordinate information. In some embodiments, the location data may comprise an address such as a street address. The location data defines a location with sufficient granularity to provide useful information to a computing device 130. The granularity or accuracy of the location data may be more precise than the granularity of a GPS based location data in circumstances where signals from at least 4 GPS satellites are not accessible to the computing device 130, resulting in an imprecise GPS based location determination. The background matching modules 152 or 162 are trained on image data obtained from the relevant urban area being monitored.

At 210, camera 120 captures at least one image of an urban area and makes the image available for processing to the processor 132. In embodiments where the computing device 130 is a smartphone or a tablet device, the camera 120 may be a camera built within (integrated into) the smartphone or tablet device. Camera 120 may be directed towards an urban area with persistent or stationary background features such as signage or other stationary background structures.

In some embodiments, the step 210 may be performed in response to the GPS receiver 126 determining inaccurate or imprecise GPS based location of the computing device 130. In some embodiments, the computing device 130 may generate a prompt to the user on the display 127 to initiate the capture of an image of the vicinity of the computing device 130. When generating a prompt, the computing device 130 may also invoke a native camera application of the computing device 130 to show the user a live field of view of the camera 120 and allow the user to provide input to trigger image capture. In some embodiments, the computing device 130 may comprise one or more accelerometers or other orientation detector to determine an orientation (e.g. vertical) of the computing device 130 (and by extension the orientation of a field of view of camera 120). Based on the orientation of the computing device 130 and the field of view of camera 120 being determined to be directed towards a street level or streetscape in an urban area, the computing device 130 may automatically initiate the capture of an image at step 210. For example, the orientation of the computing device 130 being vertical may be presumed to orient the camera 120 in a forward facing direction suitable to capture location-distinguishing features that can be used to determine the location of the computing device 130.

In some embodiments, process 200 comprises the optional step 220 of the computing device 130 processing the image captured at step 210 through the background feature extractor module 154 to extract background features. The extracted background features may be represented in a matrix or a vector data structure, for example. The step 220, if performed, reduces the amount of data required to be transmitted to the remote server system 180. The reduction in the amount of data transmitted may improve the speed of the process 200 and the amount of network bandwidth used by the computing device 130. In other embodiments, alternative data compression techniques such as transform coding, fractal compression, run-length encoding, or entropy encoding may be used.

At step 230, the computing device 130 transmits the to the remote server system 180 the background features extracted at step 220, or compressed image data or image data of the at least one image captured at step 210. The remote server 180 process the received image data, performs a background comparison against the reference background image library 184 to obtain location information associated with the image captured at step 210. FIG. 4 illustrates the detailed steps of the steps performed by the remote server 180 to obtain the location information. In some embodiments, the computing device 130 may also transmit inaccurate or imprecise GPS based location data obtained from the GPS receiver 126 to the remote server 180. The inaccurate or imprecise GPS based location data may assist the remote server 180 in narrowing or refining a search within the reference background image library 184, making the process of location determination more efficient and faster.

At step 240, the computing device 130 receives location information associated with the image captured at step 210. At step 250, the received location information may be presented on a display 127 of the computing device. In some embodiments, the location determination or estimation process 200 may be performed by an Android™ or iPhone™ location determination application 157 on the computing device. Accordingly, the location determination application 157 may present the location data received from the remote server system 180 on the display 127.

FIG. 3 is a flowchart of a process for location determination 300 according to some embodiments. The process 300 is performed by the computing device without communication with the remote server system 180.

At optional step 310, the processor 132 receives location data from the GPS receiver 126 and assessed the quality of the received GPS data. If the quality of the received GPS data falls below a certain threshold, then the rest of the image-based location determination or estimation process 300 may be performed to obtain more accurate location information. At step 311, an image of the urban area is captured by the computing device 130. In some embodiments, the location determination application 157 may prompt a user to capture an image of the urban area. Once at least one image of the urban area is captured, at step 312, the processor 132 processes the captured image to determine background descriptors associated with the image using the background feature extractor module 154. The background descriptors are in essence the persistent distinguishing aspects of the captured image that uniquely identify the background present in the captured image. In some embodiments, the background descriptors may be extracted by applying a fully convolutional network (FCN) constructed by using the feature extraction layers of a convolutional neural network (CNN) trained with a classification loss. The background feature extractor module 154 may comprise a classifier with attention parameters to explicitly measure the relevance of background descriptors and it may be trained to distinguish between persistent background features and transient background features. Persistent background features may include distinctive parts of a building in the background or a permanent light post or bollard, for example. Transient background features may include billboards or hoarding that are subject to change, for example. As an output of step 312, a set of background descriptors or features are obtained for the captured image. The background descriptors or features may be represented in the form of a vector or matrix data structure, for example. As a result of step 312, the captured image (that may be a high-resolution image) may be transformed into a compressed or succinct vector or matrix of relevant background descriptors or features.

At 314, a search is performed to select one or more candidate matching images from the library of reference background images 144. In some embodiments, the search may be a nearest neighbour search implemented by a combination of KD-tree and product quantisation (PQ). The search is performed using the pre-determined background descriptors or features of the images in the library of reference background images 144. An output of 314 is a set of candidate reference background images that are a potential match for the captured image. The points of the captured image that correspond to points in the candidate matching images may be referred to as key points. The number of key points identified between a captured image and an image in the reference background image library 144 may be considered as a factor in determining the similarity of the background in the two images.

In some embodiments, the search performed at 314 may be further refined or narrowed based on the imprecise location data received at step 310. The imprecise location data obtained at step 310 may be used to filter or select a subset of images within the reference background images 144 that could potentially be part of the imprecise location or imprecise location range based on the data received from the GPS receiver 126 at step 310.

As the number of images in the reference background image libraries 144 and 184 can be quite large (for example 10,000 to 1 million images), use of conventional image comparison techniques may not provide a substantially accurate or a substantially computationally efficient approach for comparing the image captured at 311 with each of the images in the reference background image libraries 144 or 184. The background descriptors determined at step 312 represented as a succinct vector or matrix of relevant background descriptors or features in the captured provide a computationally efficient basis for comparison with the images in the reference background image libraries 144 or 184. The background descriptors identified at step 312 provides an effective encoding of a subset of features relating to persistent or stationary background features while disregarding or excluding or deprioritising features in the captured image not relevant to the comparison with images in the reference background image libraries 144 or 184. Features in the captured image not relevant to comparison with images in the reference background image libraries 144 or 184 may include image portions or features relating to individuals, billboards or dynamic signage, for example.

At 316, geometric matching or verification is performed between the captured image and the candidate reference background images. Geometric verification includes a more detailed comparison between two images to assess if they share a common background. With the reduced number of candidate reference background images obtained at step 314, the geometric matching step is not as computationally intensive in comparison to performing geometric matching across the entire reference background image library 144. In some embodiments, the geometric verification may be performed using a random sample consensus (RANSAC). The outcome of 316 may be the confirmation of a single candidate reference image as a match for the captured image.

Figure 5:
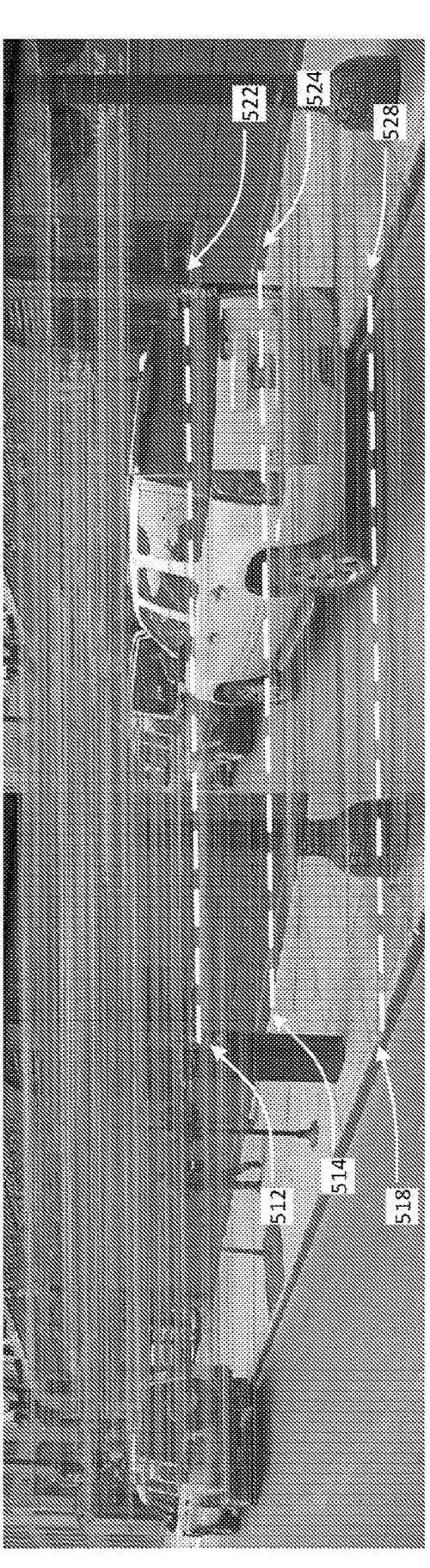
FIG. 5 is an example pair of images illustrating background matching.

As part of the geometric match validation, a matching number of points of interest may be identified between the captured image and each of the candidate reference background images. Each point of interest in the captured image may correspond to a stationary or permanent background in the image. The number of matching points of interest between two images may be used as a metric to quantify a degree to which the two images match. For example, images A and B with 30 matching points of interest may be a better match than images A and C with 10 matching points of interest. The candidate reference background image with the highest number of matching points of interest may be considered the closest match to the captured image. A point of interest match threshold of the minimum number of matching points may be used to establish a minimum degree of geometric matching. If no candidate reference background image comprises matching points of interest above the point of interest match threshold, then the captured image may be considered as not matched. In some embodiments, the point of interest match threshold maybe 5 points, 10 points, 15 points, 20 points, or 25 points, for example. FIG. 5 illustrates an example of matching points of interest between two images.

At 318, the location corresponding to the image captured at step 311 may be determined by querying the location metadata associated with the matched reference background image. At step 320, the obtained location information may be presented on the display 127 of the commuting device 130.

The process 300 of location determination of FIG. 3 is based on the reference background image library 144 stored in the computing device 130. In some embodiments, the computing device 130 may have limited capacity in memory 136 and to make the best use of the limited capacity in memory 136, the computing device may proactively or on the command of a user, download background images 146 and background image metadata 148 associated with an urban area based on location information obtained from the GPS receiver 126. As the computing device 130 may move from one urban area to another, the computing device 130 may update the reference background image library 144 to obtain background images 146 and background image metadata 148 associated with the urban are in its immediate vicinity.

FIG. 4 is a flowchart of a process for location determination 400 according to some embodiments. The process 400 is performed by the remote server system 180 operating in communicating with the computing device 130. The process 400 is the counterpart process performed by the remote server system 180 in response to the process of location determination or estimation 200 performed by the computing device 130. The process 400 relies on the reference background image library 184 on memory 172 of the remote server system 180. The memory 172 of the remote server system 180 is scalable, the reference background image library 184 may comprise background images 186 and background image metadata 188 relating a large number of urban areas providing the capability of location determination or estimation by the computing device 130 in a larger number of urban areas.

At step 410, the remote server system 180 receives image data corresponding to at least one captured by the computing device 130 at step 210 of FIG. 2. The image data may be in the form of background features extracted at step 220 or an entire image data or compressed image data, for example. In embodiments, where entire image data or compressed image data is received at step 410, at step 412 the image data may be processed by the processor 174 processes the received image data to determine background descriptors associated with the image using the background feature extractor module 164. The background descriptors are in essence the persistent distinguishing aspects of the captured image that uniquely identify the background present in the captured image. In some embodiments, the background descriptors may be extracted by applying a fully convolutional network (FCN) constructed by using the feature extraction layers of a convolutional neural network (CNN) trained with a classification loss. The background feature extractor module 164 may comprise a classifier with attention parameters to explicitly measure the relevance of background descriptors and it may be trained to distinguish between persistent background features and transient background features. Persistent background features may include distinctive parts of a building in the background or a permanent light post or bollard, for example. Transient background features may include billboards or hoarding that are subject to change, for example. As an output of step 412, a set of background descriptors or features are obtained for the captured image. The background descriptors or features may be represented in the form of a vector or matrix data structure. As a result of step 412, the received image data may be transformed into a compressed or succinct vector or matrix of relevant background descriptors or features. In some embodiments, the remote server system 180 may also receive from the computing device 130 imprecise, non-current or inaccurate location information (e.g. imprecise or inaccurate GPS location) of the computing device 130 or location information corresponding to the last known precise or accurate location of the computing device 130.

At 414, a search is performed to select one or more candidate matching images from the library of reference background images 186. In embodiments where the remote server system 180 receives the imprecise, non-current or inaccurate location data from the computing device 130, the imprecise or inaccurate location data may be used to filter or select a subset of images from the library of reference background images 186 corresponding to a range or an extrapolated range of an area associated with the imprecise or inaccurate location data. The selection of a subset of images from the library of reference background images 186 may improve the overall efficiency of the location determination process by narrowing the number of images to be searched. In some embodiments, the search may be a nearest neighbour search implemented by a combination of KD-tree and product quantisation (PQ). The search is performed using the pre-determined background descriptors or features of the images in the library of reference background images 184. An output of 414 is a set of candidate reference background images that are a potential match for the captured image. The points of the captured image that correspond to points in the candidate matching images may be referred to as key points. The number of key points identified between a captured image and an image in the reference background image library 184 may be considered as a factor in determining the similarity of the background in the two images.

At 416, geometric matching or verification is performed between the captured image and the candidate reference background images. Geometric verification includes a more detailed comparison between two images to assess if they share a common background. With the reduced number of candidate reference background images obtained at step 414, the geometric matching step is not as computationally intensive in comparison to performing geometric matching across the entire reference background image library 184. In some embodiments, the geometric verification may be performed using a random sample consensus (RANSAC). The outcome of 416 may be the confirmation of a single candidate reference image as a match for the captured image. As part of the geometric match validation, a matching number of points of interest may be identified between the captured image and each of the candidate reference background images. Each point of interest in the captured image may correspond to a stationary or permanent background in the image. The number of matching points of interest between two images may be used as a metric to quantify a degree to which the two images match. For example, images A and B with 30 matching points of interest may be a better match than images A and C with 10 matching points of interest. The candidate reference background image with the highest number of matching points of interest may be considered the closest match to the captured image. A point of interest match threshold of the minimum number of matching points may be used to establish a minimum degree of geometric matching. If no candidate reference background image comprises matching points of interest above the point of interest match threshold, then the captured image may be considered as not matched. In some embodiments, the point of interest match threshold maybe 5 points, 10 points, 15 points, 20 points, or 25 points, for example.

At 418, the remote server system 180 queries the location metadata of the single matched background image to obtain location data corresponding to image data received at step 410. The location metadata may comprise location information such as an address, or a longitude and latitude coordinates, for example.

In some embodiments, process 400 may comprise an optional step 419 of generation of a GPS correction signal by the GPS correction signal generation module 167 based on the location metadata obtained at step 418. The generated GPS correction signal may comprise data that will allow the computing device 130 to combine with the signals generated with its GPS receiver 126 to obtain a more accurate location data. The generated GPS correction may serve as an offset information for the computing device 130 to correct the signals received by its GPS receiver 126. At 420, the remote server system 180 transmits to the computing device 130, the location metadata obtained at step 418 and optionally the GPS correction signal generates at step 419.

FIG. 5 is an example image 500 illustrating a stage in the process of background matching performed by the background matching module 152 or background matching module 162. Image 500 comprises two parts, image 510 and image 520. Image 510 is a reference background image stored in the reference background image library 144 or 184. Image 520 is a captured image of an urban area using the camera 120 of the computing device 130. The various parts of a persistent background in image 520 that are not obfuscated provide a basis for comparison with the image 510 and enable the determination of a location-based on the location metadata associated with reference image 510. Feature 512 (part of parking signpost) in image 510 corresponds to the identical feature 522 in the captured image 520. Feature 514 (part of building in the background) in image 510 corresponds to the identical feature 524 in the captured image 520. Feature 518 (part of roadside curb) in image 510 corresponds to the identical feature 528 in the captured image 520.

Figure 6:
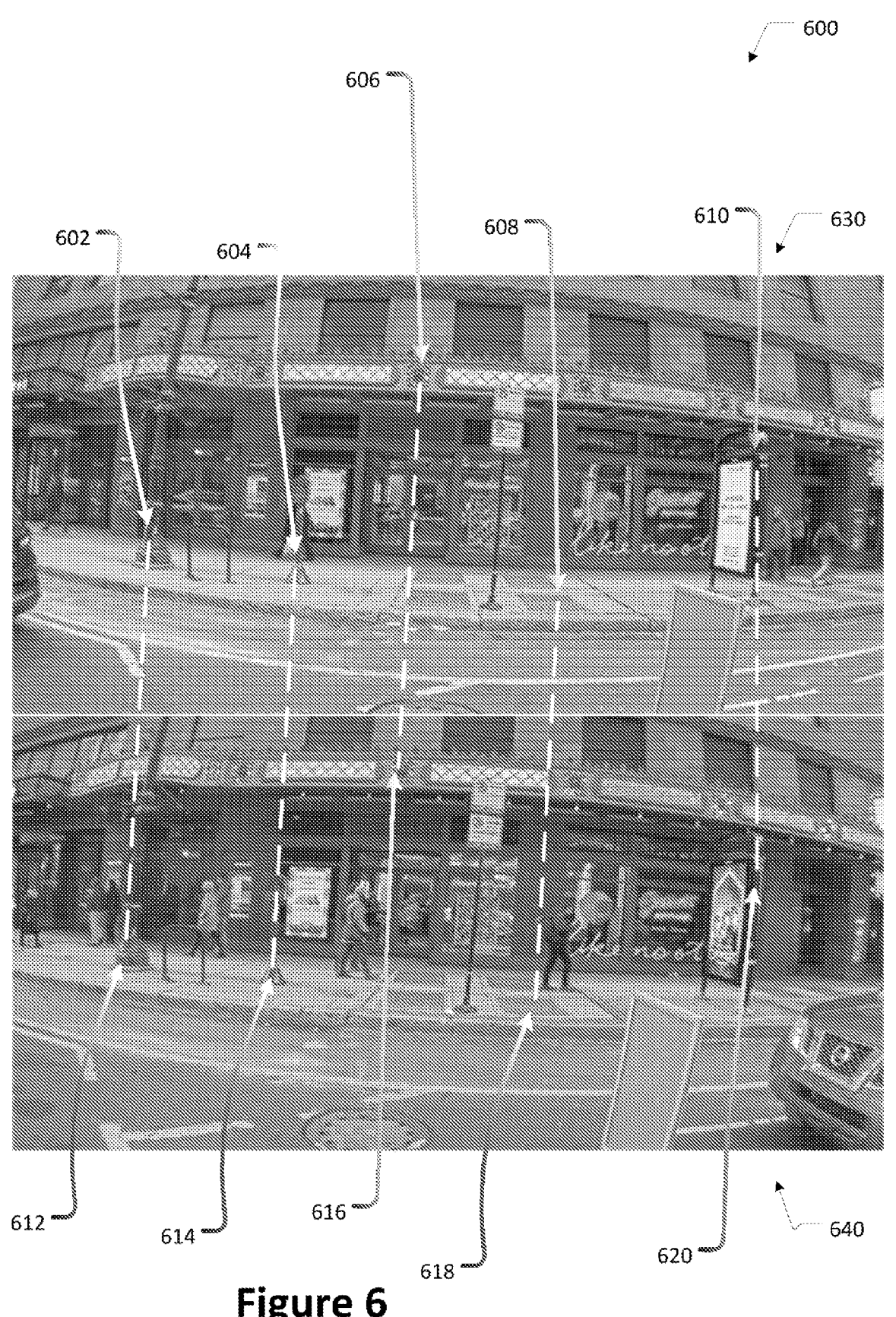
FIG. 6 is another example pair of images illustrating background matching.

FIG. 6 is an example image pair 600 illustrating a stage in the process of background matching performed by the background matching module 152. Image 600 comprises two parts, a first image 630 and a second image 640. Image 640 is a reference background image stored in the reference background image library 144. Image 630 is an image captured by camera 120 during the course of parking surveillance in an urban area. The various parts of a background in image 640 provide a basis for comparison with the image 630 and enable the determination of a parking location based on the location metadata associated with reference image 640. It is assumed that each captured image 630 will have various static image features that are also present in a reference image 640 taken at substantially the same location, even if various dynamic image features will vary over time. For example, feature 612 (part of a light post) in image 640 corresponds to the identical feature 602 in the captured image 630. Feature 614 (part of a foot of a letterbox) in image 640 corresponds to the identical feature 604 in the captured image 2130. Feature 2116 (part of a façade of a building) in image 640 corresponds to the identical façade feature 606 in the captured image 2130. Feature 2118 (a textured grate or part of the footpath) in image 640 corresponds to the identical grate or footpath feature 2108 in the captured image 2130. Feature 620 (a non-dynamic/static part of a signboard) in image 640 corresponds to the identical feature 610 in the captured image 630.

During experimentation, accuracy of the embodiments was evaluated to benchmark the performance of the embodiments. Accuracy was measured based on an accuracy of the location data received by computing device 130 at step 240 or the location data determined at step 318 using a margin of error of 0.5 m to 2 m, for example. For some embodiments, the accuracy of the determined location was in the order of 95% or greater. The accuracy performance of 95% or greater was obtained in both daytime and night time conditions and over different seasons of the year, including winter and summer.

The various models and modules of computing device 130 and the remote server 180 including the background matching module 152, background matching module 162 may be or comprise program code, libraries, Application Programming Interfaces (APIs), metadata, configuration data, dependencies, frameworks and other necessary code components or hardware components to implement the functionality of the various modules or models. The various machine learning models or components may incorporate alternative machine learning methodologies including: supervised, unsupervised, semi-supervised or reinforcement learning based methodologies, for example. The various machine learning models or components may incorporate one or more components from machine learning frameworks including: OpenCV, TensorFlow, PyTorch, Caffe, EmuCV, VXL, GDAL, MIScnn, Marvin, and Kornia, for example.

Figure 7:
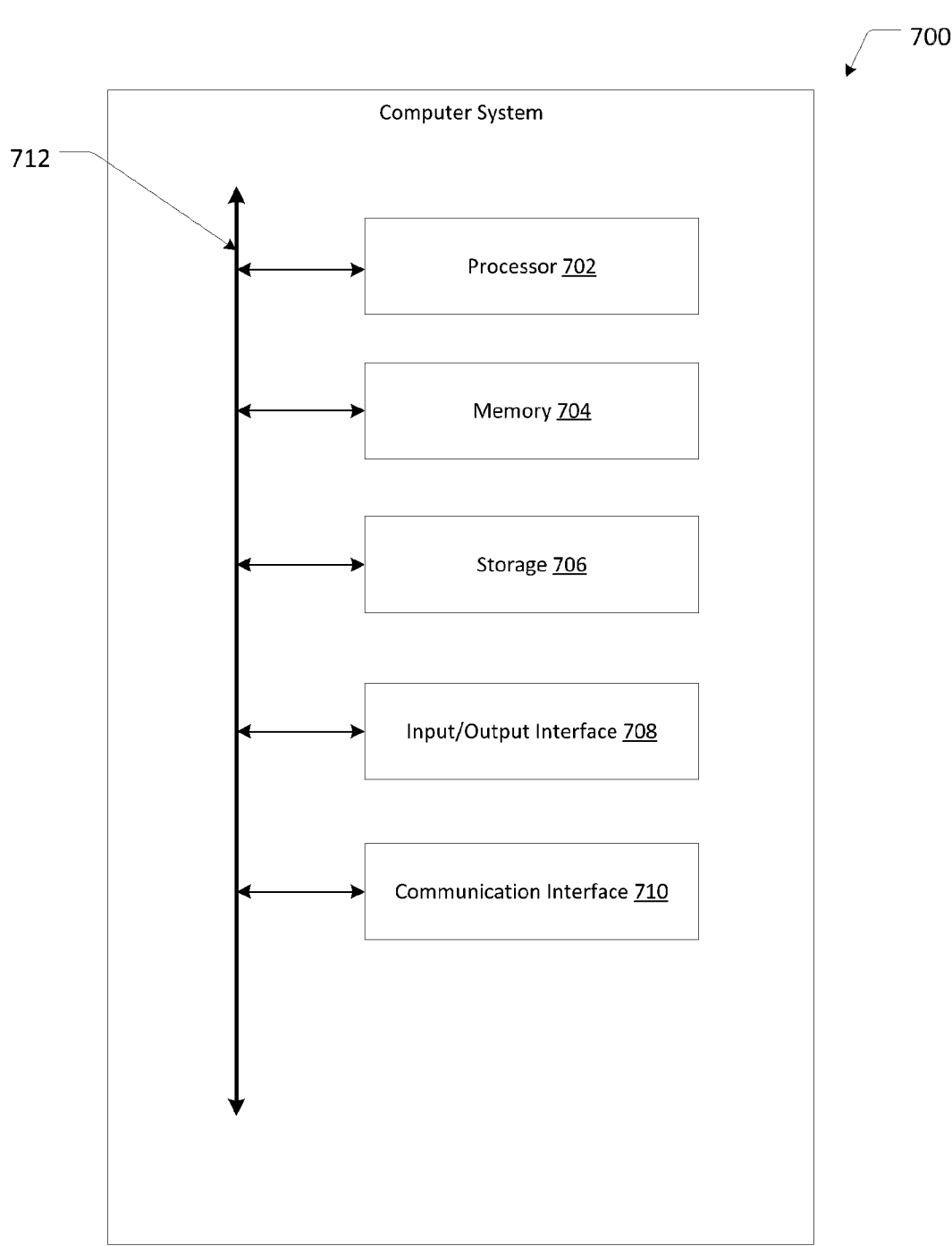
FIG. 7 is an example computer system according to some embodiments.

FIG. 7 illustrates an example computer system 700 according to some embodiments. In particular embodiments, one or more computer systems 700 perform one or more steps of one or more methods described or illustrated herein. In particular embodiments, one or more computer systems

700 provide functionality described or illustrated herein. In particular embodiments, software running on one or more computer systems 700 performs one or more steps of one or more methods described or illustrated herein or provides functionality described or illustrated herein. Particular embodiments include one or more portions of one or more computer systems 700. Herein, reference to a computer system may encompass a computing device, and vice versa, where appropriate. Moreover, reference to a computer system may encompass one or more computer systems, where appropriate. Computing device 130 is an example of computer system 700. Remote server system 180 is another example of computer system 700.

This disclosure contemplates any suitable number of computer systems 700. This disclosure contemplates computer system 700 taking any suitable physical form. As example and not by way of limitation, computer system 700 may be an embedded computer system, a system-on-chip (SOC), a single-board computer system (SBC) (such as, for example, a computer-on-module (COM) or system-on-module (SOM)), a special-purpose computing device, a desktop computer system, a laptop or notebook computer system, a mobile telephone, a server, a tablet computer system, or a combination of two or more of these. Where appropriate, computer system 700 may: include one or more computer systems 700; be unitary or distributed; span multiple locations; span multiple machines; span multiple data centers; or reside partly or wholly in a computing cloud, which may include one or more cloud computing components in one or more networks. Where appropriate, one or more computer systems 700 may perform without substantial spatial or temporal limitation one or more steps of one or more methods described or illustrated herein. As an example and not by way of limitation, one or more computer systems 700 may perform in real time or in batch mode one or more steps of one or more methods described or illustrated herein. One or more computer systems 700 may perform at different times or at different locations one or more steps of one or more methods described or illustrated herein, where appropriate.

In particular embodiments, computer system 700 includes at least one processor 702, memory 704, storage 706, an input/output (I/O) interface 708, a communication interface 710, and a bus 712. Although this disclosure describes and illustrates a particular computer system having a particular number of particular components in a particular arrangement, this disclosure contemplates any suitable computer system having any suitable number of any suitable components in any suitable arrangement.

In particular embodiments, processor 702 includes hardware for executing instructions, such as those making up a computer program. As an example and not by way of limitation, to execute instructions, processor 702 may retrieve (or fetch) the instructions from an internal register, an internal cache, memory 704, or storage 706; decode and execute them; and then write one or more results to an internal register, an internal cache, memory 704, or storage 706. In particular embodiments, processor 702 may include one or more internal caches for data, instructions, or addresses. This disclosure contemplates processor 702 including any suitable number of any suitable internal caches, where appropriate. As an example and not by way of limitation, processor 702 may include one or more instruction caches, one or more data caches, and one or more translation lookaside buffers (TLBs). Instructions in the instruction caches may be copies of instructions in memory 704 or storage 706, and the instruction caches may speed up retrieval of those instructions by processor 702. Data in the data caches may be copies of data in memory 704 or storage 706 for instructions executing at processor 702 to operate on; the results of previous instructions executed at processor 702 for access by subsequent instructions executing at processor 702 or for writing to memory 704 or storage 706; or other suitable data. The data caches may speed up read or write operations by processor 702. The TLBs may speed up virtual-address translation for processor 702. In particular embodiments, processor 702 may include one or more internal registers for data, instructions, or addresses. This disclosure contemplates processor 702 including any suitable number of any suitable internal registers, where appropriate. Where appropriate, processor 702 may include one or more arithmetic logic units (ALUs); be a multi-core processor; or include one or more processors 702. Although this disclosure describes and illustrates a particular processor, this disclosure contemplates any suitable processor.

In particular embodiments, memory 704 includes main memory for storing instructions for processor 702 to execute or data for processor 702 to operate on. As an example and not by way of limitation, computer system 700 may load instructions from storage 706 or another source (such as, for example, another computer system 700) to memory 704. Processor 702 may then load the instructions from memory 704 to an internal register or internal cache. To execute the instructions, processor 702 may retrieve the instructions from the internal register or internal cache and decode them. During or after execution of the instructions, processor 702 may write one or more results (which may be intermediate or final results) to the internal register or internal cache. Processor 702 may then write one or more of those results to memory 704. In particular embodiments, processor 702 executes only instructions in one or more internal registers or internal caches or in memory 704 (as opposed to storage 706 or elsewhere) and operates only on data in one or more internal registers or internal caches or in memory 704 (as opposed to storage 706 or elsewhere). One or more memory buses (which may each include an address bus and a data bus) may couple processor 702 to memory 704. Bus 712 may include one or more memory buses, as described below. In particular embodiments, one or more memory management units (MMUs) reside between processor 702 and memory 704 and facilitate accesses to memory 704 requested by processor 702. In particular embodiments, memory 704 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 704 may include one or more memories 704, where appropriate. Although this disclosure describes and illustrates particular memory, this disclosure contemplates any suitable memory.

In particular embodiments, storage 706 includes mass storage for data or instructions. As an example and not by way of limitation, storage 706 may include a hard disk drive (HDD), flash memory, an optical disc, a magneto-optical disc, magnetic tape, or a Universal Serial Bus (USB) drive or a combination of two or more of these. Storage 706 may include removable or non-removable (or fixed) media, where appropriate. Storage 706 may be internal or external to computer system 700, where appropriate. In particular embodiments, storage 706 is non-volatile, solid-state memory. In particular embodiments, storage 706 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 706 taking any suitable physical form. Storage 706 may include one or more storage control units facilitating communication between processor 702 and storage 706, where appropriate. Where appropriate, storage 706 may include one or more storages 706. Although this disclosure describes and illustrates particular storage, this disclosure contemplates any suitable storage.

In particular embodiments, I/O interface 708 includes hardware, software, or both, providing one or more interfaces for communication between computer system 700 and one or more I/O devices. Computer system 700 may include one or more of these I/O devices, where appropriate. One or more of these I/O devices may enable communication between a person and computer system 700. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 708 for them. Where appropriate, I/O interface 708 may include one or more device or software drivers enabling processor 702 to drive one or more of these I/O devices. I/O interface 708 may include one or more I/O interfaces 708, where appropriate. Although this disclosure describes and illustrates a particular I/O interface, this disclosure contemplates any suitable I/O interface.

In particular embodiments, communication interface 710 includes hardware, software, or both providing one or more interfaces for communication (such as, for example, packet-based communication) between computer system 700 and one or more other computer systems 700 or one or more networks. As an example and not by way of limitation, communication interface 710 may include a network interface controller (NIC) or network adapter for communicating with a wireless adapter for communicating with a wireless network, such as a WI-FI or a cellular network. This disclosure contemplates any suitable network and any suitable communication interface 710 for it. As an example and not by way of limitation, computer system 700 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 700 may communicate with a wireless cellular telephone network (such as, for example, a Global System for Mobile Communications (GSM) network, or a 3G, 4G or 5G cellular network), or other suitable wireless network or a combination of two or more of these. Computer system 700 may include any suitable communication interface 710 for any of these networks, where appropriate. Communication interface 710 may include one or more communication interfaces 710, where appropriate. Although this disclosure describes and illustrates a particular communication interface, this disclosure contemplates any suitable communication interface.

In particular embodiments, bus 712 includes hardware, software, or both coupling components of computer system 700 to each other. As an example and not by way of limitation, bus 712 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 712 may include one or more buses 712, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, (FDDs), solid-state drives (SSDs), RAM-drives, or any other suitable computer-readable non-transitory storage media, or any suitable combination of two or more of these, where appropriate. A computer-readable non-transitory storage medium may be volatile, non-volatile, or a combination of volatile and non-volatile, where appropriate.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

It will be appreciated by persons skilled in the art that numerous variations and/or modifications may be made to the above-described embodiments, without departing from the broad general scope of the present disclosure. The present embodiments are, therefore, to be considered in all respects as illustrative and not restrictive.

The invention claimed is:

1. A system for location determination, the system comprising:
    a computing device comprising at least one processor and a memory accessible to the at least one processor;
    wherein the memory comprises a library of reference background images and metadata for each reference background image, wherein the metadata comprises location information;

wherein the memory stores program code executable by the at least one processor to configure the at least one processor to:

receive an input image data from a remote computing device, wherein the input image data includes image data of at least one image captured by the remote computing device at a location to be determined;

process the received input image data using a background matching module to identify a matching reference background image;

determine location information corresponding to the input image data based on the metadata of the matching reference background image in the library; and transmit the determined location information to the remote computing device; and wherein the background matching module comprises a background feature extractor neural network trained to extract background descriptors in at least one captured image, wherein the background feature extractor neural network comprises an attention determination layer trained to determine attention weights for the background descriptors in the at least one captured image, wherein at least one of the background descriptors corresponding to a persistent background feature are given a high attention weight and at least another one of the background descriptors corresponding to a non-persistent background feature are given a low attention weight, wherein one or more permanent structures from the at least one captured image are identified by identifying the at least one of the background descriptors with the high attention weight corresponding to the persistent background feature, and the at least one processor is further configured to identify the matching reference background image by:

extracting the at least one of the background descriptors corresponding to the one or more permanent structures from the at least one captured image using the background feature extractor neural network;

selecting one or more candidate matching images from the library of background images based on the extracted at least one of the background descriptors; and performing geometric matching between the at least one captured image and the candidate matching images to select the matching reference background image.

2. The system of claim 1, wherein the geometric matching comprises identifying common visual features in the at least one captured image and each of the one or more candidate matching images.

3. The system of claim 1, wherein the geometric matching is performed using a random sample consensus process.

4. The system of claim 1, wherein the memory stores program code executable by the at least one processor to further configure the at least one processor to:

receive GPS data corresponding to the input image from the remote computing device, wherein the GPS data comprises a low data quality indicator;

generate a GPS correction signal based on the determined location information;

transmit the GPS correction signal to the remote computing device.

5. The system of claim 1, wherein the memory stores program code executable by the at least one processor to further configure the at least one processor to:

receive GPS data corresponding to the input image from the remote computing device, wherein the GPS data comprises a low data quality indicator;

determine a subset of images from the library of background images based on the GPS data; and select the one or more candidate matching images from the subset of images from the library of background images based on the extracted at least one of the background descriptors.

6. A system for location determination in an urban area, the system comprising:

at least one camera, wherein the at least one camera is positioned to capture images of the urban area while the at least one camera is moving in the urban area;

a computing device moving with the at least one camera and in communication with the at least one camera to receive the captured images;

the computing device comprising at least one processor and a memory accessible to the at least one processor;

wherein the memory comprises a library of reference background images and metadata for each reference background image, wherein the metadata comprises location information;

wherein the memory stores program code executable by the at least one processor to configure the at least one processor to:

process a captured image using a background matching module to identify a matching reference background image; and determine a location of the at least one camera and the computing device based on the metadata of the matching reference background image;

wherein the background matching module comprises a background feature extractor neural network trained to extract background descriptors in at least one captured image, wherein the background feature extractor neural network comprises an attention determination layer trained to determine attention weights for the background descriptors in the at least one captured image, wherein at least one of the background descriptors corresponding to a persistent background feature are given a high attention weight and at least another one of the background descriptors corresponding to a non-persistent background feature are given a low attention weight, wherein one or more permanent structures from the at least one captured image are identified by identifying the at least one of the background descriptors with the high attention weight corresponding to the persistent background feature, and processing the captured image using the background matching module comprises:

extracting the at least one of the background descriptors corresponding to the one or more permanent structures from the captured image using the background feature extractor neural network;

selecting one or more candidate matching images from the library of reference background images based on the extracted at least one of the background descriptors; and performing geometric matching between the captured image and the candidate matching images to select the matching reference background image.

7. The system of claim 6, wherein the geometric matching is performed using a random sample consensus process; and wherein the geometric matching comprises identifying common visual features in the at least one captured image and each of the one or more candidate matching images.

8. The system of claim 6, wherein the computing device is configured to determine the location in real-time.

9. A computer implemented method for location determination, the method performed by a computing device comprising at least one processor in communication with a memory, the method comprising:

receiving an input image by the computing device from a remote computing device, wherein the input image corresponds to a location to be determined;

processing the received input image using a background matching module provided in the memory of the computing device to identify a matching reference background image from among a library of reference background images stored in the memory;

determining location information corresponding to the input image based on the metadata of the matching reference background image; and transmitting the determined location information to the remote computing device;

wherein the background matching module comprises a background feature extractor neural network trained to identify background descriptors in at least one captured image, wherein the background feature extractor neural network comprises an attention determination layer trained to determine attention weights for the background descriptors in the at least one captured image, wherein at least one of the background descriptors corresponding to a persistent background feature are given a high attention weight and at least another one of the background descriptors corresponding to a non-persistent background feature are given a low attention weight, wherein one or more permanent structures from the at least one captured image are identified by identifying the at least one of the background descriptors with the high attention weight corresponding to the persistent background feature, and the method further comprises identifying the matching reference background image by:

extracting the at least one of the background descriptors corresponding to the one or more permanent structures from the at least one captured image using the background feature extractor neural network;

selecting one or more candidate matching images from the library of background images based on the extracted at least one of the background descriptors; and performing geometric matching between the at least one captured image and the candidate matching images to select the matching reference background image.

10. The method of claim 9, wherein the geometric matching comprises identifying common visual features in the at least one captured image and each of the one or more candidate matching images.

11. The method of claim 9, wherein the geometric matching is performed using a random sample consensus process.

12. The method of claim 9, wherein the method further comprises:

receiving GPS data corresponding to the input image from the remote computing device, wherein the GPS data comprises a low data quality indicator;

generating a GPS correction signal based on the determined location information;

transmitting the GPS correction signal to the remote computing device;

wherein the GPS correction signal comprises information accessible by the remote computing device to determine a more accurate GPS location data.

13. The method of claim 9, wherein the method further comprises:

receiving GPS data corresponding to the input image from the remote computing device, wherein the GPS data comprises a low data quality indicator;

determining a subset of images from the library of background images based on the GPS data; and selecting the one or more candidate matching images from the subset of images from the library of background images based on the extracted background descriptors.

14. A computer-readable storage medium storing instructions that when executed by a computer cause the computer to perform operations comprising:

receiving an input image by the computing device from a remote computing device wherein the input image corresponds to a location to be determined;

processing the received input image using a background matching module provided in the memory of the computing device to identify a matching reference background image from among a library of reference background images stored in the memory;

determining location information corresponding to the input image based on the metadata of the matching reference background image; and transmitting the determined location information to the remote computing device, wherein the background matching module comprises:

a background feature extractor neural network trained to extract background descriptors in at least one captured image, wherein the background feature extractor neural network comprises an attention determination layer trained to determine attention weights for the background descriptors in the at least one captured image, wherein at least one of the background descriptors corresponding to a persistent background feature are given a high attention weight and at least another one of the background descriptors corresponding to a non-persistent background feature are given a low attention weight, wherein one or more permanent structures from the at least one captured image are identified by identifying the at least one of the background descriptors with the high attention weight corresponding to the persistent background feature, and the method further comprises identifying the matching reference background image by:

extracting the at least one of the background descriptors from the captured image;

selecting one or more candidate matching images from the library of background images based on the extracted at least one of the background descriptors; and performing geometric matching between the at least one captured image and the candidate matching images to select the matching reference background image.

* * * * *